United States Patent
Huang et al.

(10) Patent No.: US 8,363,754 B2
(45) Date of Patent: Jan. 29, 2013

(54) DIGITAL SLICING DEVICE

(75) Inventors: Liang-Wei Huang, Taipei (TW);
Chih-Yung Shih, Taipei (TW);
Shieh-Hsing Kuo, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1043 days.

(21) Appl. No.: 12/313,245

(22) Filed: Nov. 18, 2008

(65) Prior Publication Data
US 2009/0135962 A1    May 28, 2009

(30) Foreign Application Priority Data

Nov. 22, 2007   (TW) .............................. 96144272 A

(51) Int. Cl.
*H03K 9/00* (2006.01)
*H04L 27/14* (2006.01)

(52) U.S. Cl. .................... 375/316; 375/320; 375/340
(58) Field of Classification Search .................. 375/260, 375/261, 262, 343, 265, 243, 245, 258
See application file for complete search history.

(56) References Cited

U.S. PATENT DOCUMENTS

| | | | | |
|---|---|---|---|---|
| 5,233,632 A * | 8/1993 | Baum et al. | ................... | 375/344 |
| 5,710,797 A * | 1/1998 | Segal et al. | ................... | 375/346 |
| 6,850,563 B1 * | 2/2005 | Hulyalkar et al. | ............ | 375/233 |
| 7,142,618 B2 * | 11/2006 | Kwon et al. | ................... | 375/344 |
| 7,606,296 B1 * | 10/2009 | Hsu et al. | ....................... | 375/150 |
| 7,835,454 B2 * | 11/2010 | Armstrong et al. | ............ | 375/260 |

* cited by examiner

*Primary Examiner* — David Ometz
*Assistant Examiner* — Qutbuddin Ghulamali
(74) *Attorney, Agent, or Firm* — McClure, Qualey & Rodack, LLP

(57) ABSTRACT

A digital slicing device is provided for making a numerical value determination with respect to an inputted modulated symbol so as to output a corresponding symbol. The digital slicing device includes a demodulating unit, a slicing unit and a re-modulating unit. The demodulating unit is for collecting at least two successive modulated symbols and for demodulating the two modulated symbols according to a modulation algorithm so as to generate two demodulated symbols. The slicing unit is for rounding the two demodulated symbols so as to generate two rounded demodulated symbols. The re-modulating unit is for re-modulating the two rounded demodulated symbols according to the modulation algorithm so as to generate two re-modulated symbols corresponding to the two modulated symbols. The two modulated symbols are generated simultaneously through conversion using the modulation algorithm.

15 Claims, 5 Drawing Sheets

DIGITAL SLICING DEVICE

CROSS-REFERENCE TO RELATED APPLICATION

This application claims priority of Taiwanese application no. 096144272, filed on Nov. 22, 2007.

BACKGROUND OF THE INVENTION

1. Field of the Invention

The invention relates to a slicing device, more particularly to a digital slicing device for application to a communications system.

2. Description of the Related Art

In a communications system, a transmitting end performs channel encoding upon information to be transmitted prior to transmission in order to reduce a bit error rate. As shown in FIG. 1, a transmitting end 100 first converts 7-bit information ($u_1$-$u_3$, $c_1$-$c_4$) into two 4-bit signals ($x_1$) ($x_2$) through a DSQ128 converting unit 10, subsequently modulates the 4-bit signals ($x_1$), ($x_2$) into modulated symbols ($a_1$), ($a_2$) having one of sixteen levels {±1, ±3, ±5, . . . , ±15} through a modulating unit 11, and finally converts the modulated symbols (a1), (a2) to analog 16-PAM symbols for subsequent transmission.

Accordingly, as shown in FIG. 2, when a receiving end 200 receives a signal, the signal is first suitably amplified by an automatic gain controller 201, then filtered by a lowpass filter 202 to remove high frequency noise components, and subsequently sent to an analog-to-digital (A/D) converter 203 for conversion into a digital signal (which is essentially the modulated symbols in the transmitting end 100). After suppressing near end crosstalk (NEXT), echo, and far end crosstalk (FEXT) through a NEXT suppressor 204, an echo suppressor 205, and a FEXT suppressor 206, respectively, the digital signal is then fed to a feed forward equalizer 207 to eliminate the effect of a previous modulated symbol, suitably amplified by a digital automatic gain controller 208, and subsequently sent to a channel decoder 209 for channel decoding, thereby extracting the 7-bit information ($u_1$-$u_3$, $c_1$-$c_4$) from the modulated symbols sent by the transmitting end 100.

In the meantime, the receiving end 200 uses a slicer 211 and an error term generator 212 to generate an error term in real-time according to the output of the digital automatic gain controller 208. The error term is provided to various components, such as the NEXT suppressor 204, the echo suppressor 205, the FEXT suppressor 206, the feed forward equalizer 207, the digital automatic gain controller 208, a timing recovery circuit 210 that is responsible for correcting timing of the A/D converter 203, etc., for real-time update.

The slicer 211 makes a numerical value determination with respect to each inputted modulated symbol in sequence according to the modulation levels, e.g., {±1, 3, ±5, . . . , ±15}, employed by the modulating unit 11 of the transmitting end 100. If the slicer 211 receives a modulated symbol (1.5), the slicer 211 determines from the modulation levels {±1, ±3, ±5, . . . , ±15} that the modulated symbol (1.5) is closer to the level (1), and outputs the symbol (1) as a determination result. At this time, the error term generator 212 coupled between input and output ends of the slicer 211 calculates an error term to be (0.5) based on the input and output signals of the slicer 211.

However, when the modulated signal is subjected to severe noise interference during transmission such that an original level (1) becomes (2.5), the slicer 211 will erroneously output the symbol (3) as its determination result, and the error term generator 212 erroneously generates an error term (−0.5) (the result of 2.5-3, while the correct error term should be 2.5−1=1.5). Updating using the incorrect error term leads to improper operations of the NEXT suppressor 204, the echo suppressor 205, the FEXT suppressor 206, the feed forward equalizer 207, the digital automatic gain controller 208, and the timing recovery circuit 210, thereby adversely affecting decoding efficiency of the channel decoder 209 and hindering reduction of the bit error rate.

SUMMARY OF THE INVENTION

Therefore, an object of the present invention is to provide a digital slicing device that can effectively reduce bit error rates.

According to this invention, there is provided a digital slicing device adapted for making a numerical value determination with respect to an inputted modulated symbol so as to output a corresponding symbol. The digital slicing device comprises a demodulating unit, a slicing unit and a re-modulating unit. The demodulating unit is adapted for collecting two successive modulated symbols and for demodulating the two modulated symbols according to a modulation algorithm so as to generate two demodulated symbols. The slicing unit is coupled to the demodulating unit for rounding the two demodulated symbols received therefrom so as to generate two rounded demodulated symbols. The re-modulating unit is coupled to the slicing unit for re-modulating the two rounded demodulated symbols received therefrom according to the modulation algorithm so as to generate two re-modulated symbols corresponding to the two modulated symbols. The two modulated symbols are generated simultaneously through conversion using the modulation algorithm.

Preferably, according to the modulation algorithm, one of the modulation symbols is obtained by dividing a sum of two symbols to be modulated by a value (N) to result in a first quotient, multiplying a remainder of the first quotient by a value (M) to result in a first product, and subtracting a value (P) from the first product. The other of the modulation symbols is obtained by subtracting a first one of the two symbols to be modulated from a second one of the two symbols to be modulated to result in a first difference, dividing the first difference by the value (N) to result in a second quotient, multiplying a remainder of the second quotient by the value (M) to result in a second product, and subtracting the value (P) from the second product.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
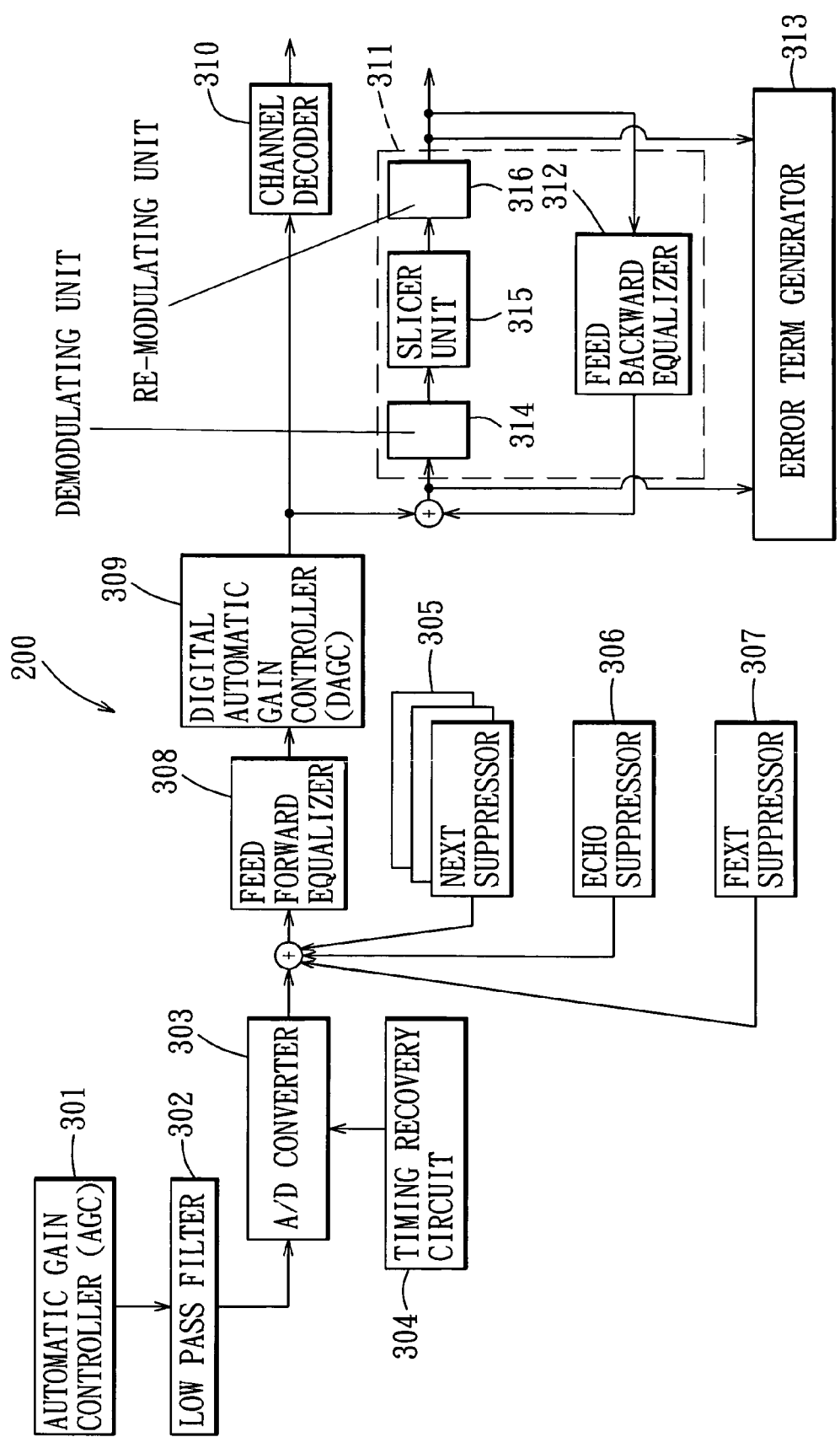
FIG. 3 is a block diagram of a receiving end of a communications system that incorporates the preferred embodiment of a digital slicing device according to the present invention.

Referring to FIG. 3, the preferred embodiment of a digital slicing device 311 according to the present invention is shown to be adapted for use in a receiving end 300 of a communications system, such as a 10Gbase-T (IEEE802.3an) system. When the receiving end 300 receives a signal, the signal is first suitably amplified by an automatic gain controller 301, then filtered by a low pass filter 302 to remove high frequency noise components, and subsequently sent to an A/D converter 303 for conversion into modulated symbols. Timing of the A/D converter 303 is corrected through a timing recovery circuit 304. After suppressing NEXT, echo, and FEXT through a NEXT suppressor 305, an echo suppressor 306 and a FEXT suppressor 307, the modulated symbols are fed to a feed forward equalizer 308 to eliminate the effect of a previous modulated symbol on a current modulated symbol. Finally, the modulated symbols are suitably amplified by a digital automatic gain controller 309, and are subsequently sent to a channel decoder 310 for decoding.

The digital slicing device 311 of this embodiment is to be disposed at an output end of the digital automatic gain controller 309 of the receiving end 300, in order to receive the modulated symbols outputted by the digital automatic gain controller 309, and to perform level analysis and numerical value determination upon the inputted modulated symbols received thereby so as to output a determination result (i.e., a corresponding symbol). The output end of the digital slicing device 311 is coupled to a feed backward equalizer 312, which processes the determination result outputted by the digital slicing device 311 and feeds the processed result to the input end of the digital slicing device 311, such that the effect of a subsequent modulated symbol upon a current modulated symbol can be eliminated.

An error term generator 313 is coupled between the input end and the output end of the digital slicing device 311. The error term generator 313 generates an error term according to a difference between the input signal and the output signal of the digital slicing device 311. The error term is provided to various components, such as the timing recovery circuit 304, the NEXT suppressor 305, the echo suppressor 306, the FEXT suppressor 307, the feed forward equalizer 308, the digital automatic gain controller 309, the feed backward equalizer 312, etc., for updating.

In order to provide a determination result closest to a modulated symbol from a transmitting end to the error term generator 313 so that the error term generator 313 would be able to generate a correct error term that is to be provided to the aforementioned components for real-time and proper updating, the digital slicing device 311 of this embodiment includes a demodulating unit 314, a slicing unit 315, and a re-modulating unit 316 connected in sequence.

Figure 1:
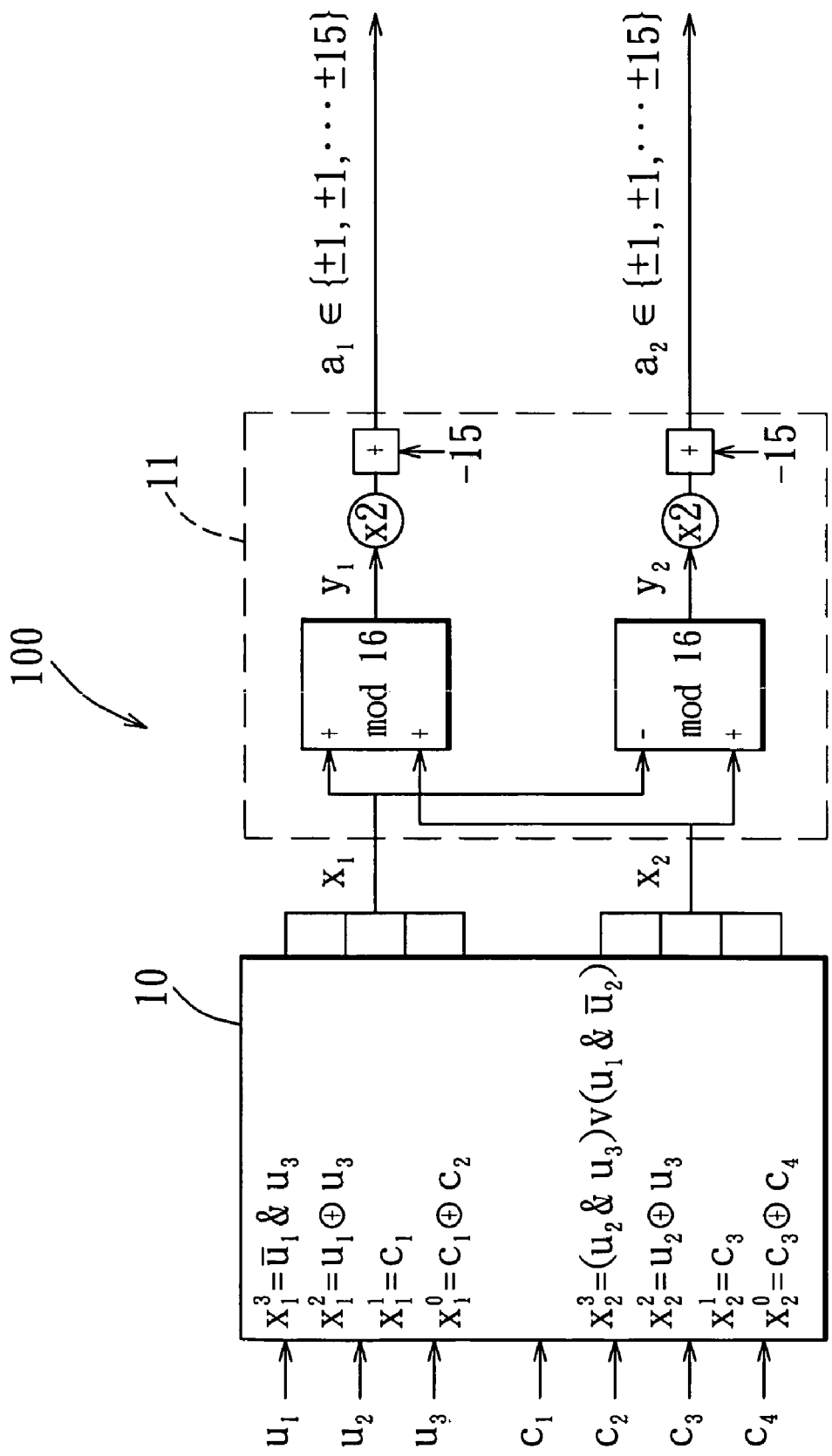
FIG. 1 is a circuit diagram of a transmitting end of a conventional communications system.
Figure 2:
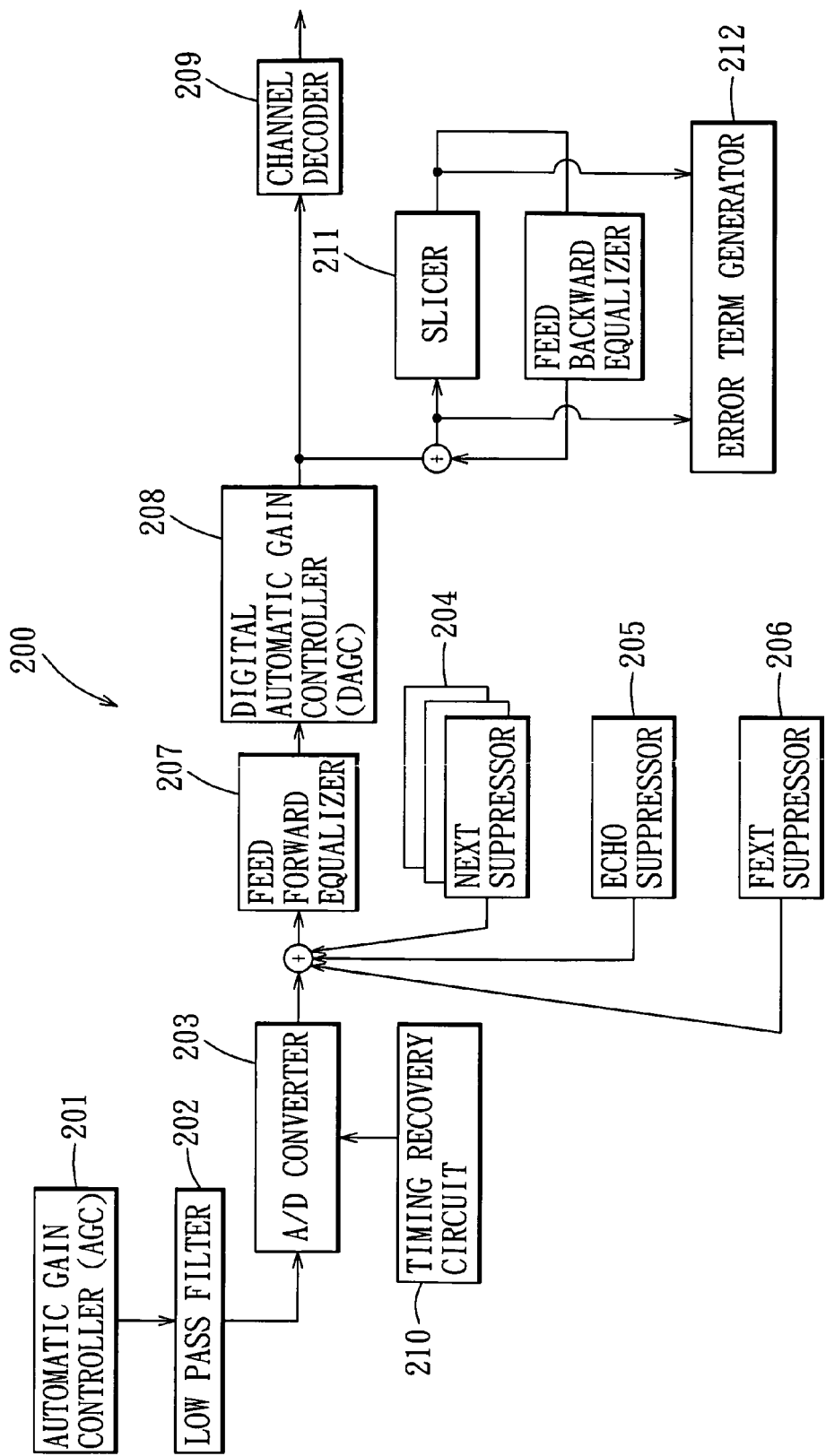
FIG. 2 is a block diagram of a receiving end of the conventional communications system.

In order to prevent a channel from being affected by noise interference, before the transmitting end sends out information, such as the 7-bit information shown in FIG. 1, the 7-bit information is first converted into two 4-bit signals $(x_1)$, $(x_2)$ through the DSQ128 converting unit 10. The 4-bit signals $(x_1)$, $(x_2)$ are then converted to digital signals $(a_1)$, $(a_2)$ having one of sixteen levels $\{\pm 1, \pm 3, \pm 5, \ldots, \pm 15\}$ through the modulating unit 11 according to a modulation algorithm (Equations 1 and 2). The digital signals $(a_1)$, $(a_2)$ are to be further converted to analog 16-PAM symbols for subsequent transmission and are assumed to have respective values of 5 and 1 in the following example.

$$\begin{bmatrix} y_1 \\ y_2 \end{bmatrix} = \overbrace{\begin{bmatrix} 1 & 1 \\ -1 & 1 \end{bmatrix}}^{R} \begin{bmatrix} x_1 \\ x_2 \end{bmatrix} \bmod 16 \quad \text{Equation 1}$$

$$\begin{bmatrix} a_1 \\ a_2 \end{bmatrix} = 2\begin{bmatrix} y_1 \\ y_2 \end{bmatrix} - \begin{bmatrix} 15 \\ 15 \end{bmatrix} \quad \text{Equation 2}$$

Therefore, when the receiving end 300 of FIG. 3 receives two 16-PAM symbols in succession, the 16-PAM symbols are processed through the automatic gain controller 301, the low pass filter 302, and the A/D converter 303, as well as through the NEXT suppressor 305, the echo suppressor 306 and the FEXT suppressor 307 to remove noise interference in the channel. After further processing through the feed forward equalizer 308 and the digital automatic gain controller 309, two digitized modulated symbols $(s_1)$, $(s_2)$ are outputted. However, since there still exists signal noise such as additive white gaussian noise (AWGN) in the signal transmission channel that cannot be cancelled by the circuits of the receiving end 300, it is possible that the signal received by the receiving end 300 would be affected by interference such that two successive modulated symbols $(s_1)$, $(s_2)$ outputted by the digital automatic gain controller 309 have erroneous numerical values.

Figure 4:
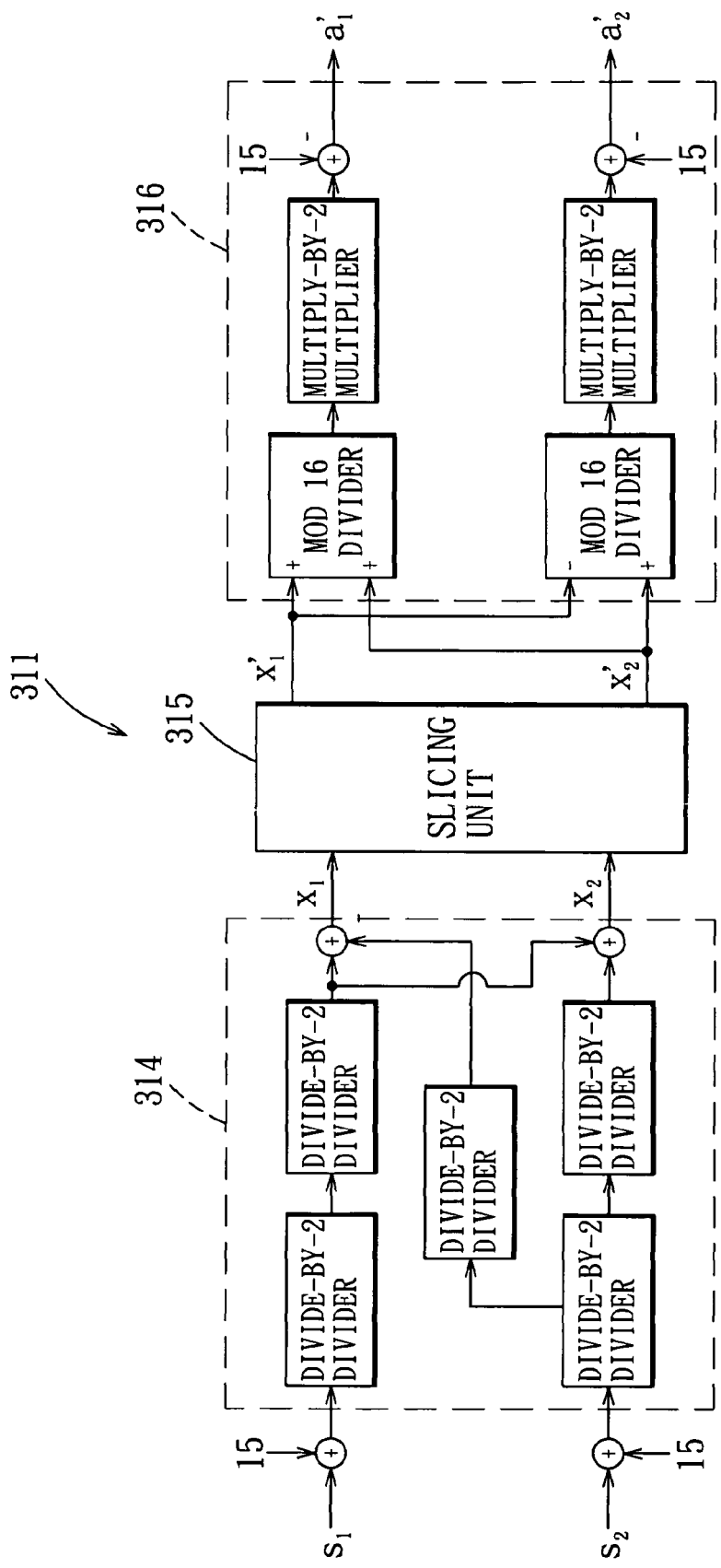
FIG. 4 is a block diagram of the preferred embodiment.

In order to make the determination result of the digital slicing device 311 more accurate, the demodulating unit 314 of the digital slicing device 311 first collects two successive inputted modulated symbols $(s_1)$, $(s_2)$ (such as 3 and 1 in the example) Then, according to the modulation algorithm used by the modulating unit 11 in FIG. 1, the modulated symbols $(s_1)$, $(s_2)$ are demodulated via calculation of the following Equation 3. A circuit structure of the demodulating unit 314 for realizing Equation 3 is shown in FIG. 4. The value (15) is added to the first modulated symbol $(s_1)$ to result in a sum, which is divided by 4 through two divide-by-2 dividers to result in a first quotient. The value (15) is added to the second modulated symbol $(s_2)$ to result in a sum, which is divided by four through two divide-by-2 dividers to result in a second quotient. The second quotient is subtracted from the first quotient to result in a first one of the demodulated symbols $(x_1)$. A second one of the demodulated symbols $(x_2)$ is obtained by adding together the first and second quotients.

$$\overbrace{\begin{bmatrix} 0.5 & -0.5 \\ 0.5 & 0.5 \end{bmatrix}}^{R^{-1}} \begin{bmatrix} (s_1+15)/2 \\ (s_2+15)/2 \end{bmatrix} = \begin{bmatrix} x_1 \\ x_2 \end{bmatrix} \quad \text{Equation 3}$$

Therefore, after the two modulated symbols $(s_1)$, $(s_2)$ are demodulated by the demodulating unit 314, two corresponding demodulated symbols $(x_1)$, $(x_2)$ are obtained. In the example where $(s_1)$ and $(s_2)$ are respectively 3 and 1, $(x_1)$ and $(x_2)$ are 0.5 and 8.5, respectively. The demodulated symbols $(x_1)$, $(x_2)$ (0.5 and 8.5) are then sent to the slicing unit 315 for rounding processing. In this embodiment, the slicing unit 315 rounds the two demodulated symbols $(x_1)$, $(x_2)$ according to symmetric arithmetic rounding so as to generate two rounded demodulated symbols $(x_1')$, $(x_2')$ (i.e., 1 and 9 in the example). Thereafter, the rounded demodulated symbols $(x_1')$, $(x_2')$ (1 and 9) are sent to the re-demodulating unit 316 for re-modulation according to the same modulation algorithm (Equations 4 and 5). A circuit structure of the re-modulating unit 316 for realizing Equations 4 and 5 is shown in FIG. 4. A first one of the rounded demodulated symbol $(x_1')$ is added to a second one of the rounded demodulated symbols $(x_2')$ to result in a sum, which is processed by a mod 16 divider to result in a remainder, which in turn is multiplied by 2 through a multiplier to result in a product, from which the value (15)

is subtracted to obtain a first re-modulated symbol ($a_1'$) (i.e., 5 in the example). On the other hand, the first rounded demodulated symbol ($x_1'$) is subtracted from the second rounded demodulated symbol ($x_2'$) to result in a difference, which is processed by a mod 16 divider to result in a remainder, which in turn is multiplied by 2 through a multiplier to result in a product, from which the value (15) is subtracted to obtain a second re-modulated symbol ($a_2'$) (i.e., 1 in the example). Accordingly, the re-modulated symbols ($a_1'$), ($a_2'$) have values the same as those of the modulated symbols ($a_1$), ($a_2$) from the modulating unit 11 of the transmitting end 100.

$$\begin{bmatrix} y_1 \\ y_2 \end{bmatrix} = \overbrace{\begin{bmatrix} 1 & 1 \\ -1 & 1 \end{bmatrix}}^{R} \begin{bmatrix} x_1 \\ x_2 \end{bmatrix} \bmod 16 \qquad \text{Equation 4}$$

$$\begin{bmatrix} a_1 \\ a_2 \end{bmatrix} = 2 \begin{bmatrix} y_1 \\ y_2 \end{bmatrix} - \begin{bmatrix} 15 \\ 15 \end{bmatrix} \qquad \text{Equation 5}$$

Figure 5:
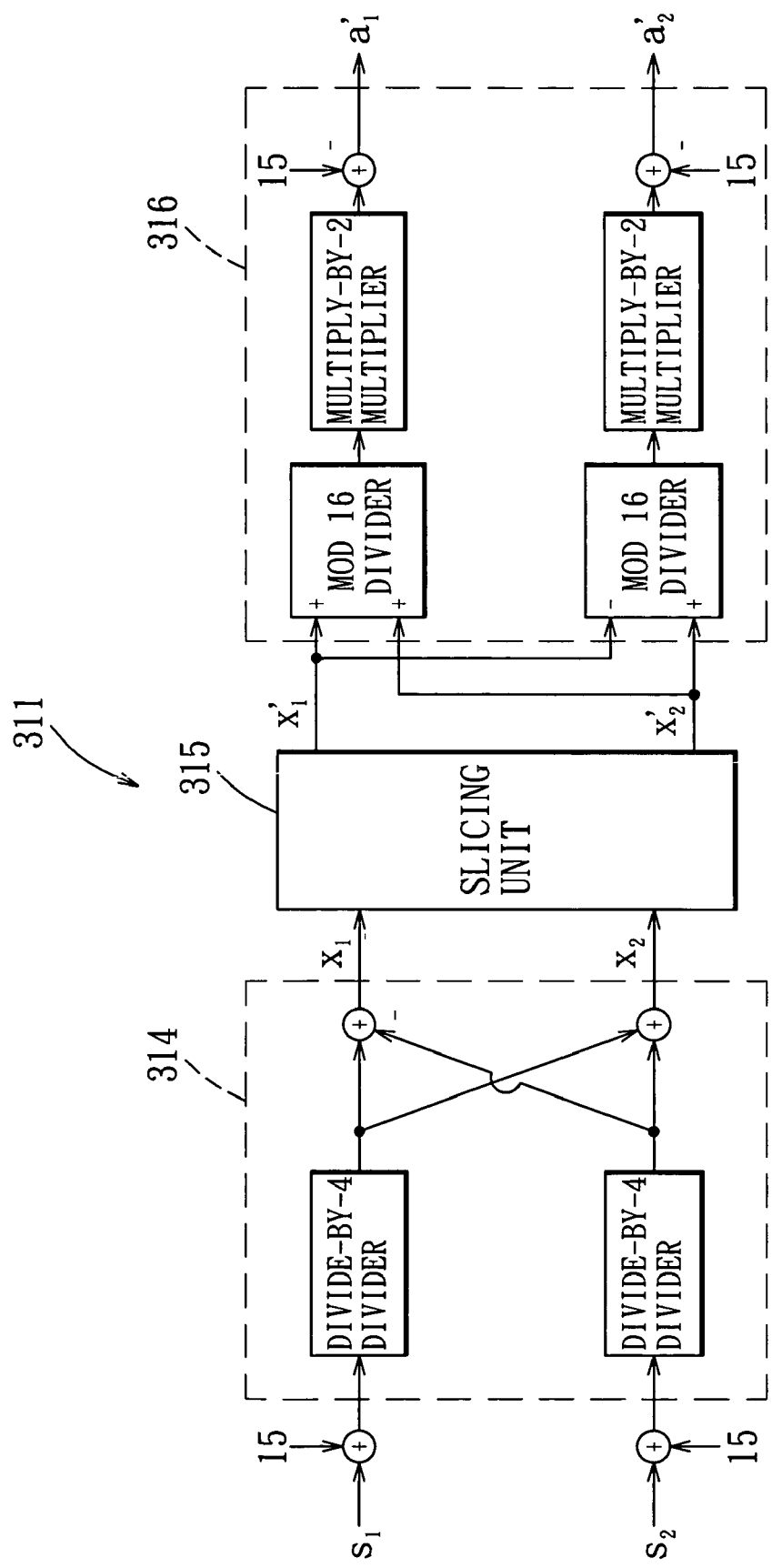
FIG. 5 is a block diagram of a possible modification of the digital slicing device of FIG. 4.

It is apparent to those skilled in the art that each cascaded pair of divide-by-2 dividers in FIG. 4 may be replaced by a single divide-by-4 divider, as shown in FIG. 5. In addition, multiplication and division operations may be realized in each of the demodulating unit 314 and the re-modulating unit 316 using shifting components.

It has thus been shown that the digital slicing device 311 demodulates the inputted modulated symbols according to the modulation mechanism of the modulating unit 11 of the transmitting end 100, and then performs rounding of the demodulated symbols to effectively eliminate error portions generated in the inputted modulated symbols such that the outputted results are closer to the modulated symbols of the transmitting end 100. The error term generator 313 would be able to generate correct error terms according to the input and output signals of the digital slicing device 311 to be provided to the aforementioned timing recovery circuit 304, NEXT suppressor 305, echo suppressor 306, FEXT suppressor 307, feed forward equalizer 308, digital automatic gain controller 309 and feed backward equalizer 312 for real-time updating, thereby enabling the receiving end 300 to reduce error bit rates effectively. It can be appreciated by those skilled in the art that the same principle may be followed when applied to (N) modulated symbols, where the matrices (R) and ($R^{-1}$) in the Equations are to be changed from two-dimensional to N-dimensional.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A digital slicing device adapted for making a numerical value determination with respect to an inputted modulated symbol so as to output a corresponding symbol, said digital slicing device comprising:
   a demodulating unit adapted for collecting two successive modulated symbols and for demodulating the two modulated symbols according to a modulation algorithm so as to generate two demodulated symbols;
   a slicing unit coupled to said demodulating unit for rounding the two demodulated symbols received therefrom so as to generate two rounded demodulated symbols; and
   a re-modulating unit coupled to said slicing unit for re-modulating the two rounded demodulated symbols received therefrom according to the modulation algorithm so as to generate two re-modulated symbols corresponding to the two modulated symbols;
   wherein the two modulated symbols are generated simultaneously through conversion using the modulation algorithm.

2. The digital slicing device as claimed in claim 1, wherein, according to the modulation algorithm,
   one of the modulation symbols is obtained by dividing a sum of two symbols to be modulated by a value (N) to result in a first quotient, multiplying a remainder of the first quotient by a value (M) to result in a first product, and subtracting a value (P) from the first product, and
   the other of the modulation symbols is obtained by subtracting a first one of the two symbols to be modulated from a second one of the two symbols to be modulated to result in a first difference, dividing the first difference by the value (N) to result in a second quotient, multiplying a remainder of the second quotient by the value (M) to result in a second product, and subtracting the value (P) from the second product.

3. The digital slicing device as claimed in claim 2, wherein said demodulating unit obtains a first one of the demodulated symbols by adding the value (P) to a first one of the two modulated symbols to result in a first sum, dividing the first sum by a value (Q) to result in a third quotient, adding the value (P) to a second one of the two modulated symbols to result in a second sum, dividing the second sum by the value (Q) to result in a fourth quotient, and subtracting the fourth quotient from the third quotient, and
   said demodulating unit obtains a second one of the demodulated symbols by adding together the third and fourth quotients.

4. The digital slicing device as claimed in claim 3, wherein said re-modulating unit obtains a first one of the re-modulated symbols by adding a first one of the rounded demodulated symbols to a second one of the rounded demodulated symbols to result in a third sum, dividing the third sum by the value (N) to result in a fifth quotient, multiplying a remainder of the fifth quotient by the value (M) to result in a third product, and subtracting the value (P) from the third product, and
   said re-modulating unit obtains a second one of the re-modulated symbols by subtracting the first one of the rounded demodulated symbols from the second one of the rounded demodulated symbols to result in a second difference, dividing the second difference by the value (N) to result in a sixth quotient, multiplying a remainder of the sixth quotient by the value (M) to result in a fourth product, and subtracting the value (P) from the fourth product.

5. The digital slicing device as claimed in claim 4, wherein the value (N) is equal to 16, the value (M) is equal to 2, and the value (P) is equal to 15.

6. The digital slicing device as claimed in claim 5, wherein each of the two successive modulated symbols is expressed as 4-bit binary information.

7. The digital slicing device as claimed in claim 4, wherein multiplication and division operations are realized in said demodulating unit and said re-modulating unit using shifting components.

8. The digital slicing device as claimed in claim 3, wherein the value (P) is equal to 15 and the value (Q) is equal to 4.

9. The digital slicing device as claimed in claim 2, wherein the value (N) is equal to 16, the value (M) is equal to 2, and the value (P) is equal to 15.

10. The digital slicing device as claimed in claim 9, wherein each of the two successive modulated symbols is expressed as 4-bit binary information.

11. The digital slicing device as claimed in claim 1, wherein the modulation algorithm involves use of a 2-dimensional matrix for modulation and re-modulation.

12. The digital slicing device as claimed in claim 1, wherein said slicing unit rounds the two demodulated symbols according to symmetric arithmetic rounding.

13. A digital slicing device adapted for making a numerical value determination with respect to an inputted modulated symbol so as to output a corresponding symbol, said digital slicing device comprising:

- a demodulating unit adapted for collecting a number (N) of successive modulated symbols and for demodulating the (N) modulated symbols according to a modulation algorithm so as to generate (N) demodulated symbols;
- a slicing unit coupled to said demodulating unit for rounding the (N) demodulated symbols received therefrom so as to generate (N) rounded demodulated symbols; and
- a re-modulating unit coupled to said slicing unit for re-modulating the (N) rounded demodulated symbols received therefrom according to the modulation algorithm so as to generate (N) re-modulated symbols corresponding to the (N) modulated symbols;
- wherein the (N) modulated symbols are generated simultaneously through conversion using the modulation algorithm, and (N) is at least 3.

14. The digital slicing device as claimed in claim 13, wherein the modulation algorithm involves use of a N-dimensional matrix for modulation and re-modulation.

15. The digital slicing device as claimed in claim 13, wherein said slicing unit rounds the (N) demodulated symbols according to symmetric arithmetic rounding.

* * * * *